US012685959B2

(12) United States Patent  
Hosoi

(10) Patent No.: US 12,685,959 B2  
(45) Date of Patent: Jul. 21, 2026

(54) CANISTER

(71) Applicant: Futaba Industrial Co., Ltd., Okazaki (JP)

(72) Inventor: Masahito Hosoi, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 335 days.

(21) Appl. No.: 18/395,228

(22) Filed: Dec. 22, 2023

(65) Prior Publication Data

US 2024/0246021 A1     Jul. 25, 2024

(30) Foreign Application Priority Data

Jan. 24, 2023     (JP) ................................. 2023-008838

(51) Int. Cl.  
B01D 53/04 (2006.01)  
F02M 25/08 (2006.01)

(52) U.S. Cl.  
CPC ..... B01D 53/0415 (2013.01); B01D 53/0446 (2013.01); F02M 25/0836 (2013.01); F02M 25/0854 (2013.01); B01D 2257/708 (2013.01); B01D 2259/402 (2013.01); B01D 2259/4516 (2013.01)

(58) Field of Classification Search  
CPC ........................ B01D 53/0415; B01D 53/0446  
See application file for complete search history.

(56) References Cited

U.S. PATENT DOCUMENTS 12,076,689 B2 *   9/2024   Iwamoto ............ B01D 53/0446  
2022/0252025 A1   8/2022   Nakagawa et al.

FOREIGN PATENT DOCUMENTS

JP        2002235610 A  *   8/2002  
JP        2022120492 A      8/2022

* cited by examiner

*Primary Examiner* — Robert A Hopkins  
(74) *Attorney, Agent, or Firm* — Withrow + Terranova, PLLC; Vincent K. Gustafson

(57) ABSTRACT

A canister comprises an outer case, an inner case arranged inside the outer case, and a first adsorption chamber arranged in the inner case, a second adsorption chamber arranged in the inner case between the first adsorption chamber and an atmosphere port, a first adsorbent accommodated in the first adsorption chamber, a second adsorbent accommodated in the second adsorption chamber, and a plate-shaped filter arranged between the second adsorbent and the atmosphere port. The filter comprises a first plate surface in contact with the second adsorbent, a second plate surface in contact with the outer case, and a side surface connecting the first plate surface and the second plate surface to each other. At least one of the second plate surface or the side surface comprises an open portion spaced from both the inner case and the outer case.

15 Claims, 14 Drawing Sheets

CANISTER

CROSS-REFERENCE TO RELATED APPLICATIONS

This application claims the benefit of priority based on Japanese patent application No. 2023-008838 filed on Jan. 24, 2023 with the Japan Patent Office, and the entire disclosure of Japanese patent application 2023-008838 is incorporated herein by reference.

BACKGROUND

The present disclosure relates to a canister.

A canister for inhibiting release of evaporated fuel to the atmosphere is mounted on a fuel tank of a vehicle. The canister adsorbs evaporated fuel to an adsorbent. The canister also desorbs the fuel from the adsorbent and purges the fuel by suctioned air, thereby supplying the fuel to an engine.

The canister is generally provided with multiple adsorption chambers. There is a known canister having multiple adsorption chambers in which a gas flow direction is changed (see, for example, Japanese Unexamined Patent Application Publication No. 2022-120492).

SUMMARY

In the above-described canister with multiple adsorption chambers in which a flow direction is changed, depending on positions and shapes of the adsorption chambers, there may be some parts from which molds cannot be pulled out when forming a case of the canister. In this case, it is necessary to divide the case into multiple parts.

In the canister with the case divided into multiple parts, a filter of an adsorbent is arranged to extend over the multiple parts. Thus, holding of the filter may be hindered by vibration of the vehicle.

An aspect of the present disclosure is to provide a canister that can stably hold a filter while reducing manufacturing costs.

An embodiment of the present disclosure is a canister that adsorbs and desorbs evaporated fuel generated in a fuel tank of a vehicle. The canister comprises: an outer case comprising a charge port that takes in the evaporated fuel, a purge port that discharges the evaporated fuel, and an atmosphere port open to an atmosphere: an inner case arranged inside the outer case and comprising an internal space connected to the atmosphere port directly or through another chamber: a first adsorption chamber arranged in the internal space of the inner case: a second adsorption chamber arranged between the first adsorption chamber and the atmosphere port in a flow path of the evaporated fuel in the internal space of the inner case: a first adsorbent accommodated in the first adsorption chamber; a second adsorbent accommodated in the second adsorption chamber; and a filter having a plate shape and arranged between the second adsorbent and the atmosphere port in the flow path of the evaporated fuel.

A gas flow direction in the second adsorption chamber intersects a gas flow direction in the first adsorption chamber. The filter comprises a first plate surface in contact with the second adsorbent, a second plate surface at least a part of which is in contact with the outer case, and a side surface connecting the first plate surface and the second plate surface to each other. At least one of the second plate surface or the side surface comprises an open portion spaced from both the inner case and the outer case.

With this configuration, by inserting the inner case into the outer case, it is possible to obtain the canister comprising the first adsorption chamber and the second adsorption chamber having flow directions different from one another. In addition, the second plate surface of the filter is in contact with the outer case and at least one of the second plate surface or the side surface of the filter comprises the open portion, thereby making it possible to stably hold the filter while ensuring a gas flow path.

In an embodiment of the present disclosure, the outer case may have a rib extending in a direction parallel to the second plate surface of the filter. The second plate surface may comprise a contact portion in contact with the rib and an open portion. With this configuration, it is possible to stably hold the filter while ensuring the area of the open portion of the filter.

In an embodiment of the present disclosure, the inner case may comprise an accommodation portion covering the side surface of the filter. The accommodation portion may be in contact with the rib. With this configuration, a load that the filter receives from the rib is distributed to the accommodation portion. Thus, it is possible to reduce damage to the filter caused by the vibration of the vehicle.

In an embodiment of the present disclosure, the rib may extend in a direction parallel to an insertion direction of the inner case into the outer case. The rib may comprise a guide surface inclined to guide an insertion of the inner case into the outer case. This configuration facilitates an operation to insert the inner case into the outer case. Thus, the effect of reducing the manufacturing costs is promoted.

In an embodiment of the present disclosure, the outer case may comprise a holding portion that holds the inner case together with the rib. With this configuration, the vibration of the inner case is inhibited. Thus, the effect of stably holding the filter is promoted.

In an embodiment of the present disclosure, the outer case may comprise a main body into which the inner case is inserted. The rib may comprise a support portion in contact with the second plate surface of the filter and a leg portion connecting the main body and the support portion to each other. A width of the support portion may be larger than a width of the leg portion. With this configuration, a contact area between the filter and the rib can be increased.

In an embodiment of the present disclosure, the side surface may comprise an open portion. This configuration allows the outer case to support the entire second plate surface, thereby making it possible to more stably hold the filter.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

Hereinafter, some embodiments applied with the present disclosure will be described with reference to the drawings.

1. First Embodiment

[1-1. Configuration]

Figure 1:
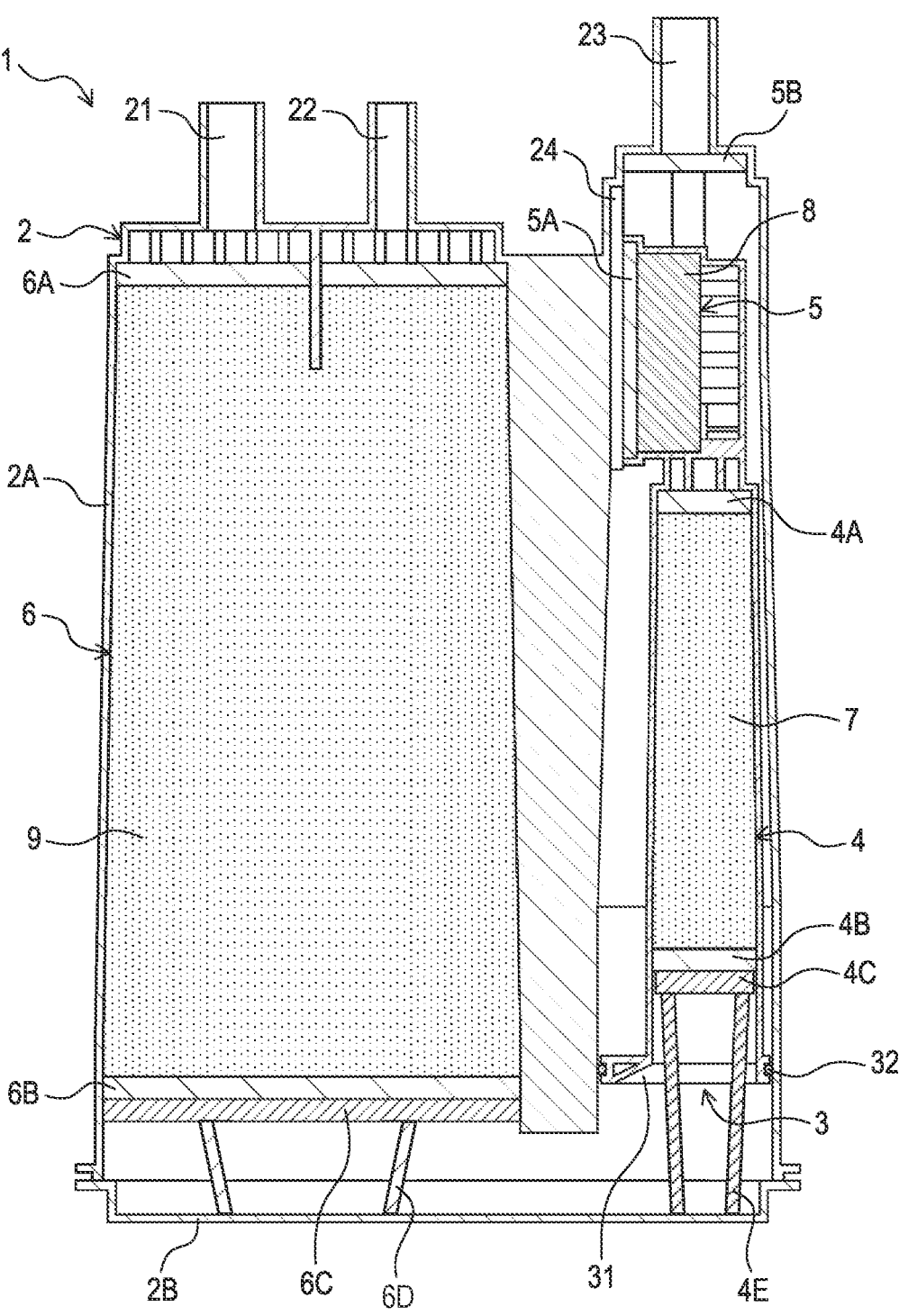
FIG. 1 is a schematic cross-sectional view of a canister in an embodiment.

A canister 1 shown in FIG. 1 is an evaporated fuel treatment device that adsorbs and desorbs evaporated fuel generated in a fuel tank of a vehicle.

The canister 1 comprises an outer case 2, an inner case 3, a first adsorption chamber 4, a second adsorption chamber 5, a third adsorption chamber 6, a first adsorbent 7, a second adsorbent 8, and a third adsorbent 9.

<Outer Case>

The outer case 2 is a housing comprising an internal space in which the inner case 3 and the third adsorption chamber 6 are arranged, a charge port 21, a purge port 22, and an atmosphere port 23.

The charge port 21 is connected to the fuel tank of the vehicle by a piping. The charge port 21 is configured to take evaporated fuel generated in the fuel tank into the canister 1.

The purge port 22 is connected to an intake pipe of the engine of the vehicle through a purge valve. The purge port 22 is configured to discharge the evaporated fuel in the canister 1 from the canister 1 and supply the evaporated fuel to the engine.

The atmosphere port 23 is open to the atmosphere. The atmosphere port 23 is configured to release gas, from which the evaporated fuel is removed, into the atmosphere. The atmosphere port 23 is also configured to take in external air (i.e., purge air) to thereby desorb (i.e. purge) the evaporated fuel adsorbed by the canister 1.

The outer case 2 comprises a main body 2A provided with the charge port 21, the purge port 22, the atmosphere port 23, and an opening through which the inner case 3 can be inserted. The outer case 2 further comprises a lid 2B attached to the opening of the main body 2A.

Figure 2:
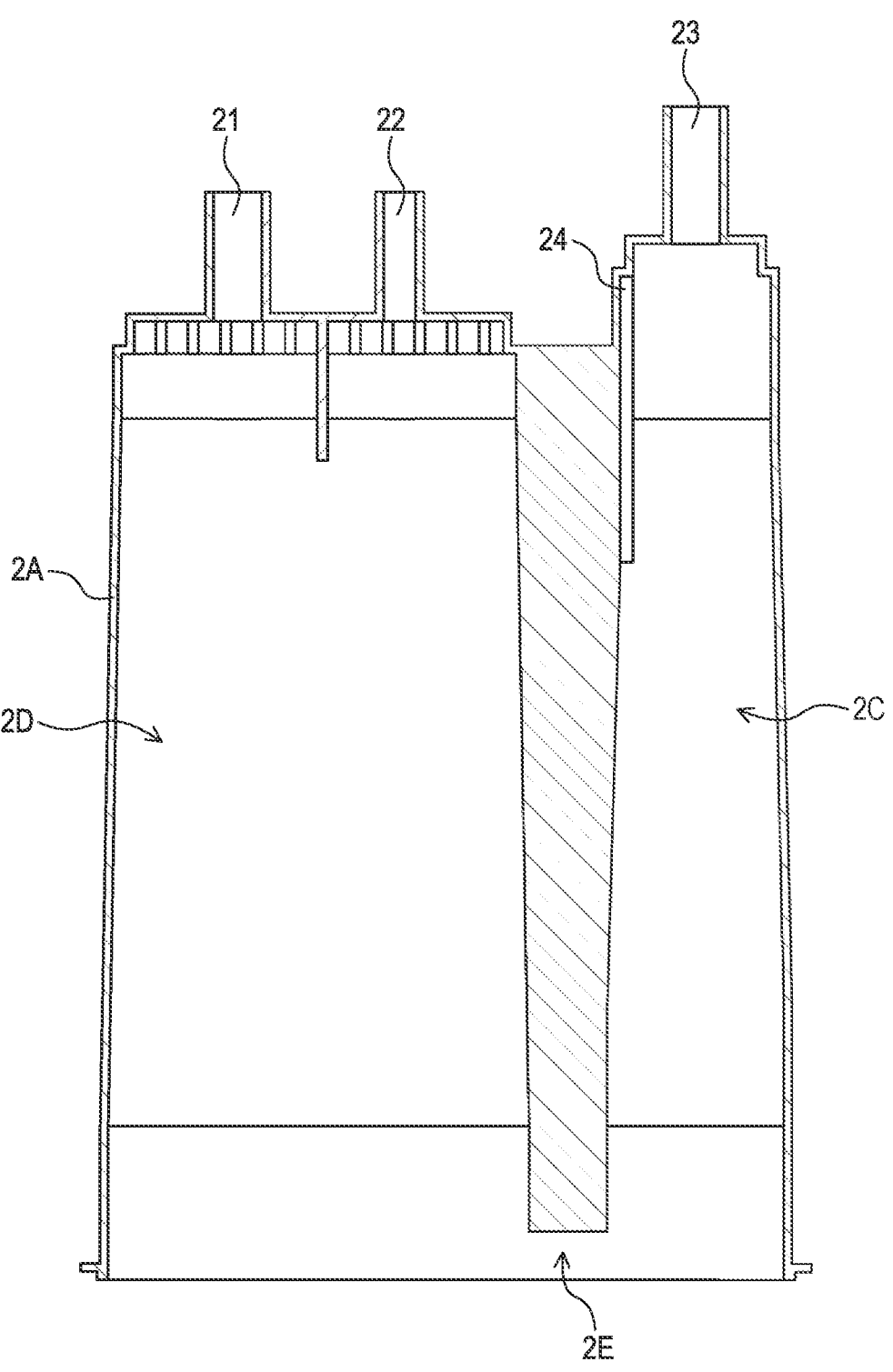
FIG. 2 is a schematic cross-sectional view of a main body of an outer case in the canister of FIG. 1.

As shown in FIG. 2, the main body 2A comprises a first space 2C in which the inner case 3 is arranged, a second space 2D in which the third adsorption chamber 6 is arranged, and a communicating portion 2E forming a communicating passage between the first space 2C and the second space 2D.

The outer case 2 also comprises a plate-shaped rib 24 protruding from an inner surface defining the first space 2C of the main body 2A. The rib 24 extends, in the first space 2C, in a direction parallel to an insertion direction of the inner case 3 (i.e., in a direction parallel to a second plate surface 52 of a first filter 5A defining the second adsorption chamber 5). A thickness direction of the rib 24 is perpendicular to a protruding direction and an extending direction of the rib 24 from the main body 2A. The width (i.e. thickness) of the rib 24 is constant along the protruding direction from the main body 2A.

<Inner Case>

Figure 3A:
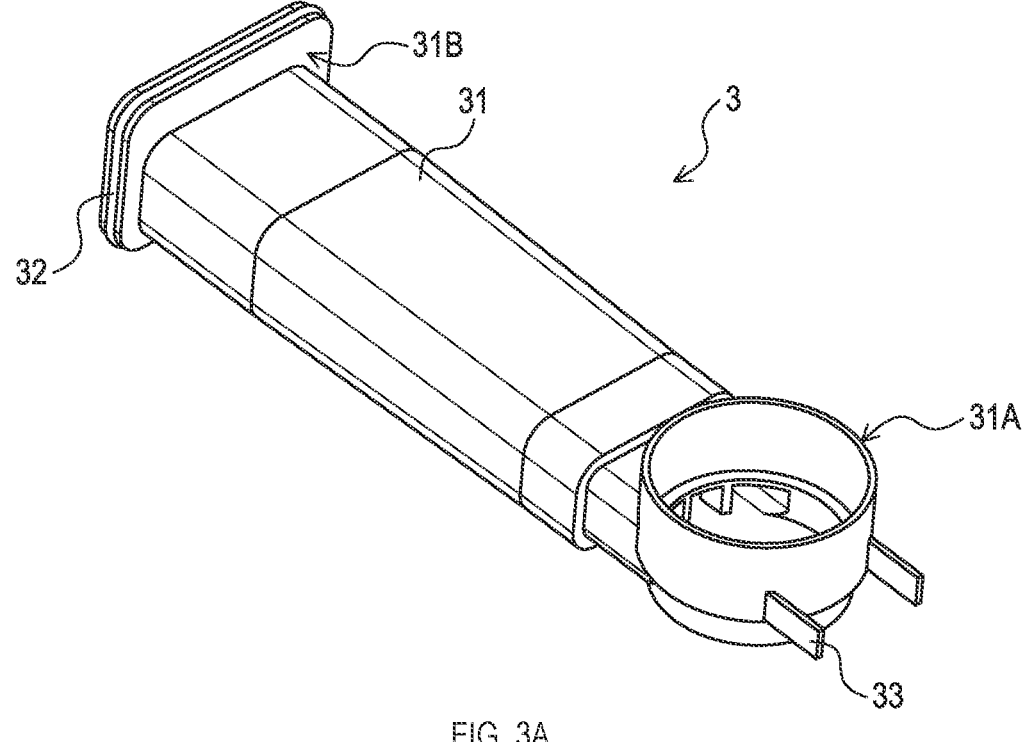
FIG. 3A is a schematic perspective view of an inner case in the canister of FIG. 1.
Figure 3B:
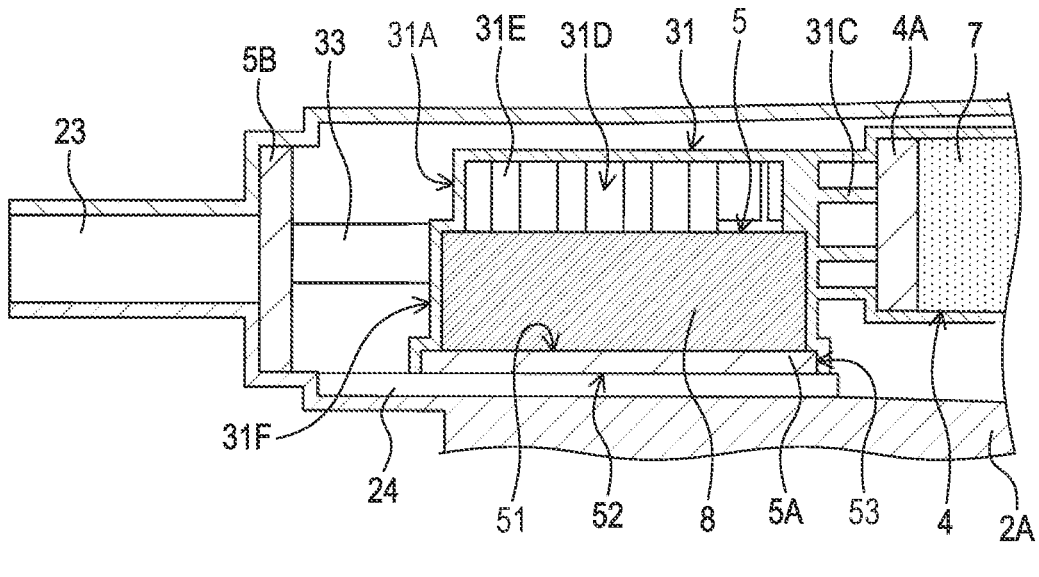
FIG. 3B is a schematic cross-sectional view of an area around a second adsorption chamber in the canister of FIG. 1.

The inner case 3 shown in FIGS. 3A and 3B is arranged inside the outer case 2, and comprises an internal space to which the atmosphere port 23 is directly connected without interposing any other adsorption chambers.

The inner case 3 is obtained, for example, by molding a resin using a mold. The inner case 3 comprises a cylindrical member 31 in a cylindrical shape, a sealing member 32, and a protrusion 33. The cylindrical member 31 comprises a first end 31A that changes a gas flow direction and a flanged second end 31B.

The first end 31A is an end connected to the atmosphere port 23. The first end 31A comprises a rotating portion 31D that rotates the gas flow direction approximately 90° with respect to the first adsorption chamber 4 provided by a middle portion of the tube 31, and an accommodation portion 31F having an inner diameter larger than that of the rotating portion 31D.

The rotating portion 31D is provided adjacent to the first adsorption chamber 4, and is partitioned from the first adsorption chamber 4 by multiple partition members 31C extending in an axial direction. The rotating portion 31D forms a space providing a communication between the first adsorption chamber 4 and the second adsorption chamber 5 provided by the accommodation portion 31F.

The central axis of the tube 31 is bent at the rotating portion 31D. In addition, a rib 31E is arranged inside the rotating portion 31D. The rib 31E is in contact with the second adsorbent 8 from a side opposite the first filter 5A. Note that, in FIG. 3A, the illustration of the rib 31E is omitted.

The accommodation portion 31F is a cylindrical part provided in continuity with the rotating portion 31D and located more outside than the rotating portion 31D in the axial direction of the cylindrical member 31. In the accommodation portion 31F, the second adsorbent 8 is arranged, thereby forming the second adsorption chamber 5.

The first filter 5A is stored at an end of the accommodation portion 31F. The accommodation portion 31F covers a side surface 53 of the first filter 5A. An outer end of the accommodation portion 31F is in contact with the rib 24 of the outer case 2.

The second end 31B is an end located on a side opposite the first end 31A. That is, the second end 31B is an end communicating with the third adsorption chamber 6. The second end 31B has an outer diameter larger than that of any part of the cylindrical member 31 except for the second end 31B. However, the outer diameter of the second end 31B may be equal to or less than the outer diameter of the first end 31A.

The sealing member 32 is arranged around the outer peripheral surface of the second end 31B. The sealing member 32 is an elastic ring-shaped member and is fitted into a groove formed around the outer peripheral surface of the second end 31B. The sealing member 32 is arranged to fill a gap in a joint portion between the outer case 2 and the inner case 3.

As the sealing member 32, an O-ring, a gasket, and the like can be used. By a frictional force of the sealing member 32, the position of the inner case 3 is maintained with respect to the outer case 2. In the present embodiment, the inner case 3 is not joined to the outer case 2 at a part other than the sealing member 32. That is, in the present embodiment, there is no welding point between the inner case 3 and the outer case 2.

The protrusion 33 protrudes from the first end 31A toward the atmosphere port 23. The protrusion 33 presses a second filter 5B toward the atmosphere port 23.

<First Adsorption Chamber>

As shown in FIG. 1, the first adsorption chamber 4 is arranged in the internal space of the inner case 3 (specifically, in the middle portion of the cylindrical member 31).

The first adsorption chamber 4 accommodates the first adsorbent 7, and communicates with the third adsorption chamber 6 so that gas can flow freely between the first adsorption chamber 4 and the third adsorption chamber 6 through a flow path defined by the outer case 2. The first adsorption chamber 4 is arranged alongside the third adsorption chamber 6 in a radial direction of the third adsorption chamber 6 so that the gas flow direction is parallel to the third adsorption chamber 6.

The first adsorption chamber 4 is defined by a first filter 4A and a second filter 4B, which are arranged inside the cylindrical member 31 of the inner case 3. As shown in FIG. 3B, the first filter 4A is in contact with the partition member 31C.

As shown in FIG. 1, the second filter 4B partitions the communicating passage between the first adsorption chamber 4 and the third adsorption chamber 6 from the first adsorption chamber 4. The second filter 4B is pressed toward the second adsorption chamber 5 and the atmosphere port 23 by a spring 4E through a latticed grid 4C. The grid 4C may have a slit shape, porous shape, or other shapes.

The first filter 4A and the second filter 4B, which define the first adsorption chamber 4, are configured to allow the gas to pass through, while not allowing the first adsorbent 7 to pass through. That is, the filters 4A, 4B hold the first adsorbent 7 therebetween in the first adsorption chamber 4.

<Second Adsorption Chamber>

The second adsorption chamber 5 is arranged in the internal space of the inner case 3 (specifically, inside the first end 31A).

The second adsorption chamber 5 accommodates the second adsorbent 8, and is arranged between the first adsorption chamber 4 and the atmosphere port 23 in the flow path of the evaporated fuel. The second adsorption chamber 5 communicates with both the first adsorption chamber 4 and the atmosphere port 23. The gas flow direction in the second adsorption chamber 5 intersects with the gas flow direction in the first adsorption chamber 4 (specifically, at a substantially right angle).

The area of a cross section of the second adsorption chamber 5 perpendicular to the gas flow direction is larger than the area of a cross section of the first adsorption chamber 4 perpendicular to the gas flow direction. The length of the second adsorption chamber 5 in the gas flow direction is smaller than the length of the first adsorption chamber 4 in the gas flow direction. However, the length of the second adsorption chamber 5 in the gas flow direction may be larger than the length of the first adsorption chamber 4 in the gas flow direction.

As shown in FIG. 3B, the second adsorption chamber 5 is defined by the first filter 5A arranged to block the first end 31A of the inner case 3 and a step and the rib 31E in the first end 31A. The second filter 5B is arranged between the first filter 5A and the atmosphere port 23.

The first filter 5A is a plate-shaped member arranged between the second adsorbent 8 and the atmosphere port 23 in the flow path of the evaporated fuel, and partitions a space communicating with the atmosphere port 23 from the second adsorption chamber 5.

The first filter 5A is press-fitted into the accommodation portion 31F of the inner case 3 so as to overlap the second adsorbent 8. That is, the accommodation portion 31F accommodates the second adsorbent 8 and the first filter 5A.

The first filter 5A comprises a first plate surface 51 in contact with the second adsorbent 8, the second plate surface 52 partially in contact with the rib 24 of the outer case 2, and the side surface 53 connecting the first plate surface 51 and the second plate surface 52 to each other.

The first plate surface 51 covers the entire surface of the second adsorbent 8 from which gas is discharged toward the atmosphere port 23. The entire side surface 53 is in contact with the accommodation portion 31F of the inner case 3 from the inside.

Figure 4A:
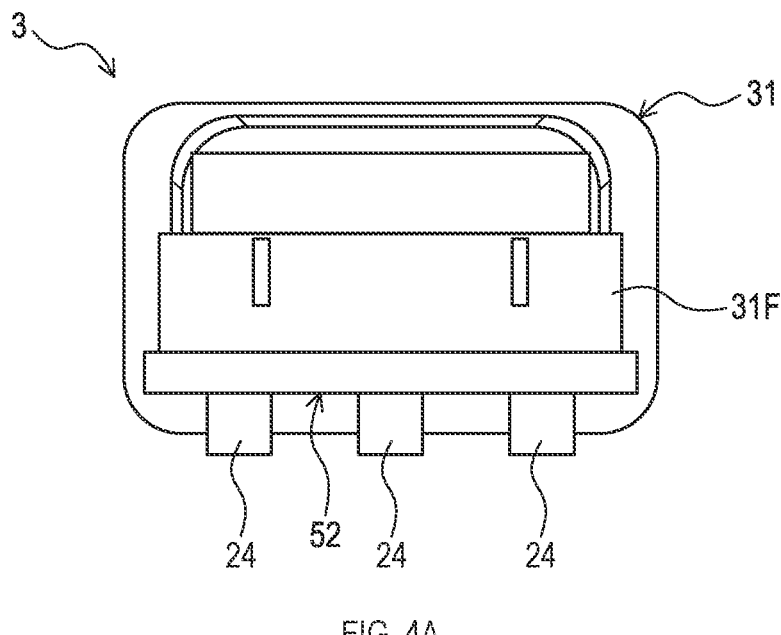
FIG. 4A is a schematic front view showing a relationship between the inner case and a rib in the canister of FIG. 1.
Figure 4B:
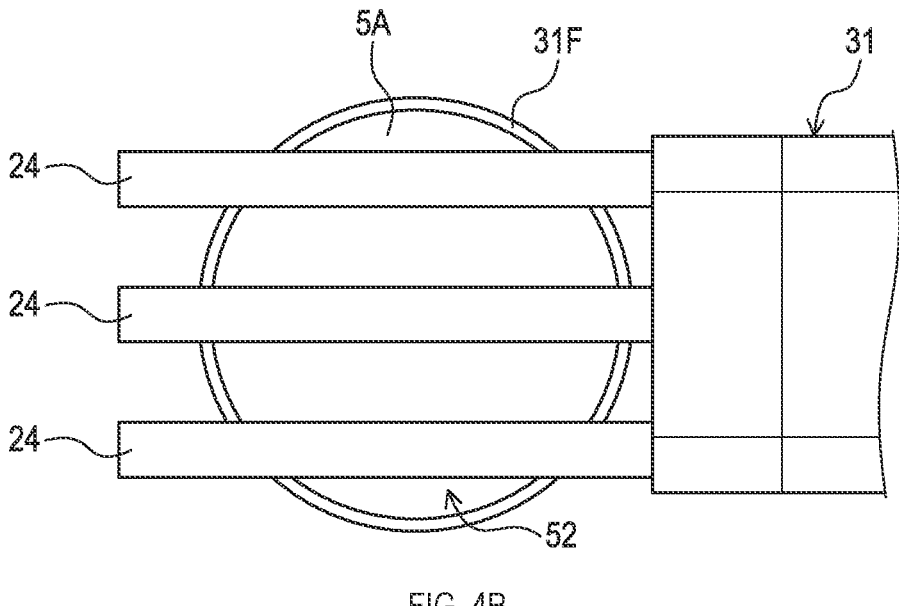
FIG. 4B is a schematic bottom plan view showing a relationship between the inner case and the rib in the canister of FIG. 1.

As shown in FIGS. 4A and 4B, the second plate surface 52 comprises a contact portion that is in contact with the rib 24 of the outer case 2, and an open portion that is not in contact with the rib 24. The open portion of the second plate surface 52 is a portion away from both the inner case 3 and the outer case 2.

In FIGS. 4A and 4B, the second plate surface 52 is in contact with multiple ribs 24 arranged side by side in parallel to each other, but the second plate surface 52 may be in contact with only one rib 24. When the second plate surface 52 is in contact with the multiple ribs 24, the second plate surface 52 comprises multiple contact portions and multiple open portions alternately arranged.

The rib 24 is in contact with not only the first filter 5A, but also the edge of the accommodation portion 31F. Specifically, in an extending direction of the rib 24, the rib 24 is in contact with the accommodation portion 31F in at least two locations across the contact portion of the second plate surface 52.

The open portion of the first filter 5A faces the inner surface of the outer case 2 in a part from which the rib 24 protrudes. Therefore, the flow direction of gas passing through the second adsorption chamber 5 is changed by collision with this part of the inner surface.

The second filter 5B shown in FIG. 3B is fixed to the outer case 2 by, for example, ultrasonic welding. The inner case 3 is inserted into the outer case 2 so that the protrusion 33 is pressed against the second filter 5B. Thus, if the protrusion 33 can hold the second filter 5B, the second filter 5B is not necessarily fixed to the outer case 2.

The first filter 5A defining the second adsorption chamber 5 and the second filter 5B arranged adjacent to the atmosphere port 23 have a function similar to that of the filters 4A and 4B of the first adsorption chamber 4.

The second adsorbent 8 is a block-shaped agglomerate of solidified granular adsorbent or an aggregate of fibrous adsorbent. The surface of the second adsorbent 8 opposite the atmosphere port 23 in the gas flow direction is in contact with the step of the first end 31A and the rib 31E. Therefore, between the second adsorbent 8 and the partition member 31C, a buffer space defined by the rotating portion 31D is provided. No adsorbent is arranged in this buffer space.

Since the first filter 5A is not welded in the second adsorption chamber 5, it is possible to inhibit separation of the agglomerate or aggregate of the adsorbent due to vibration during welding. In addition, since the cross-sectional area of the second adsorption chamber 5 is larger than the cross-sectional area of the first adsorption chamber 4, it is possible to inhibit an increase in ventilation resistance of the canister 1 even if an agglomerate or an aggregate with high ventilation resistance is used as the second adsorbent 8.

The direction of the gas passed through the first adsorption chamber 4 is changed in the rotating portion 31D, and the gas enters the second adsorption chamber 5. Then, the direction of the gas passed through the second adsorption chamber 5 is changed again due to the inner wall of the outer case 2 facing the first filter 5A. Then, the gas is released from the atmosphere port 23.

Note that inner case 3 is installed in the main body 2A of the outer case 2 in the form of a cartridge filled with the first adsorbent 7 and the second adsorbent 8. After the inner case 3 is installed, the lid 2B of the outer case 2 is attached to the main body 2A.

<Third Adsorption Chamber>

As shown in FIG. 1, the third adsorption chamber 6 is arranged inside the outer case 2 and outside the inner case 3 (specifically, in the second space 2D of the outer case 2).

The third adsorption chamber 6 accommodates the third adsorbent 9, and is connected to the charge port 21 and the purge port 22. The third adsorption chamber 6 adsorbs the evaporated fuel taken in from the charge port 21. The third adsorption chamber 6 discharges the adsorbed evaporated fuel from the purge port 22.

The third adsorption chamber 6 is defined by a first filter 6A and a second filter 6B which are respectively arranged inside the outer case 2. The first filter 6A partitions a space communicating with the charge port 21 and the purge port 22, which are connected to the third adsorption chamber 6, from the third adsorption chamber 6.

The second filter 6B partitions the communicating passage between the third adsorption chamber 6 and the first adsorption chamber 4 from the third adsorption chamber 6. The second filter 6B is pressed toward the charge port 21 and the purge port 22 through a latticed grid 6C by a spring 6D. The grid 6C may have a slit shape, porous shape, or other shapes.

The filters 6A, 6B defining the third adsorption chamber 6 have a function similar to that of the filters 4A, 4B of the first adsorption chamber 4.

The evaporated fuel taken in from the charge port 21 is adsorbed to the third adsorbent 9 in the third adsorption chamber 6. Excessive evaporated fuel not adsorbed in the third adsorption chamber 6 moves to the first adsorption chamber 4 in the inner case 3 and is adsorbed to the first adsorbent 7 in the first adsorption chamber 4.

Furthermore, excessive evaporated fuel not adsorbed in the first adsorption chamber 4 moves to the second adsorption chamber 5 in the inner case 3 and is adsorbed to the second adsorbent 8 in the second adsorption chamber 5. The gas, from which the evaporated fuel has been removed or reduced by adsorption, is released from the atmosphere port 23.

By taking in air from the atmosphere port 23, the evaporated fuel adsorbed in each of the first adsorption chamber 4, the second adsorption chamber 5, and the third adsorption chamber 6 is discharged to the engine from the purge port 22. As a result, air containing the evaporated fuel is supplied to the engine.

<Adsorbent>

The first adsorbent 7, the second adsorbent 8, and the third adsorbent 9 respectively adsorb the evaporated fuel and butane which are supplied to the canister 1 together with air and the like. These adsorbents also desorb the evaporated fuel and butane by introduction of external air. The desorbed evaporated fuel is supplied to the engine.

Examples of materials to be used as the first adsorbent 7, the second adsorbent 8, and the third adsorbent 9 may include activated carbon and zeolite. Examples of the activated carbon may include an aggregate of granular adsorbent, molded activated carbon formed into a honeycomb shape, and fibrous activated carbon formed into a sheet shape, a rectangular parallelepiped shape, a columnar shape, and a rectangular columnar shape. The first adsorbent 7, the second adsorbent 8, and the third adsorbent 9 may be the same type of adsorbent or may be different types of adsorbents.

<Variation of First Embodiment>

Figure 5A:
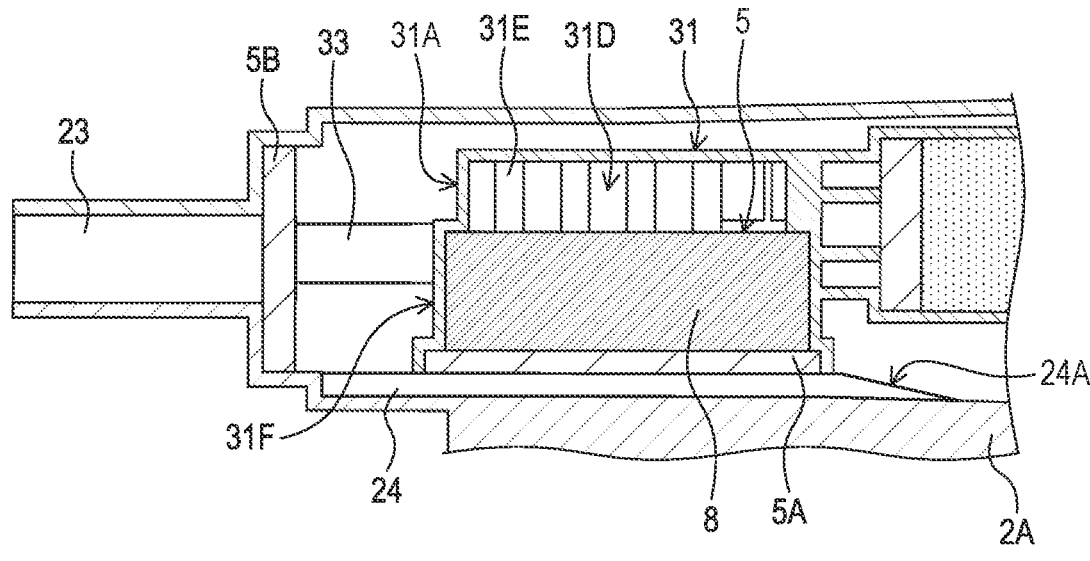
FIG. 5A is a schematic cross-sectional view of an area around a second adsorption chamber of a canister in an embodiment different from FIG. 3B.

As shown in FIG. 5A, the rib 24 may comprise a guide surface 24A inclined to guide the insertion of the inner case 3 into the outer case 2. The guide surface 24A is inclined so that a distance from the inner surface of the outer case 2 increases toward the atmosphere port 23.

That is, the guide surface 24A is configured to guide the first end 31A of the inner case 3, which is inserted into the outer case 2 from the side opposite the atmosphere port 23, into the first space 2C of the outer case 2. This facilitates an operation to insert the inner case 3 into the outer case 2. Therefore, the effect of reducing the manufacturing costs of the canister 1 is promoted.

Figure 5B:
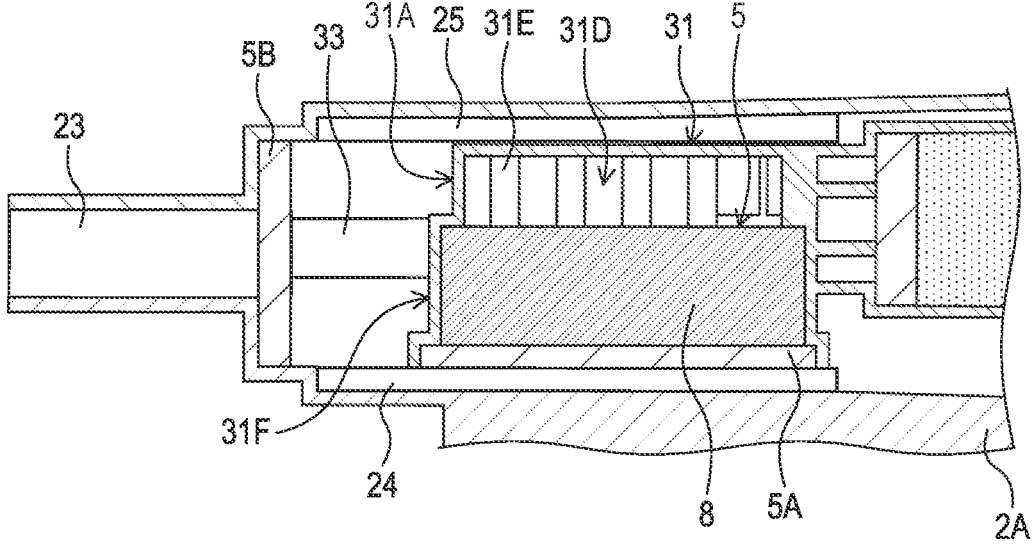
FIG. 5B is a schematic cross-sectional view of an area around a second adsorption chamber of a canister in an embodiment different from FIG. 3B.

As shown in FIG. 5B, the outer case 2 may comprise a holding portion 25. The holding portion 25 is a plate-shaped or block-shaped part that holds the first end 31A of the inner case 3 together with the rib 24. The holding portion 25 protrudes from the inner surface of the main body 2A to face the rib 24 in the first space 2C of the outer case 2. The holding portion 25 reduces the vibration of the inner case 3. This promotes the effect of stably holding the first filter 5A.

Figure 6A:
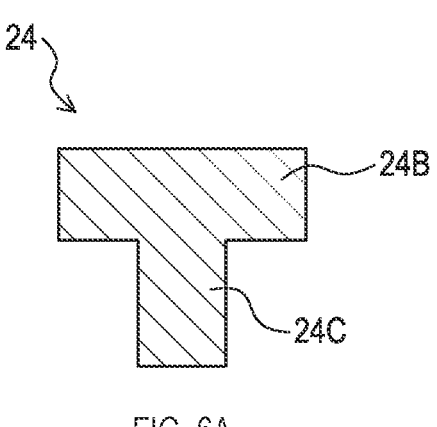
FIG. 6A is a schematic cross-sectional view of a rib in an embodiment different from FIG. 1.
Figure 6B:
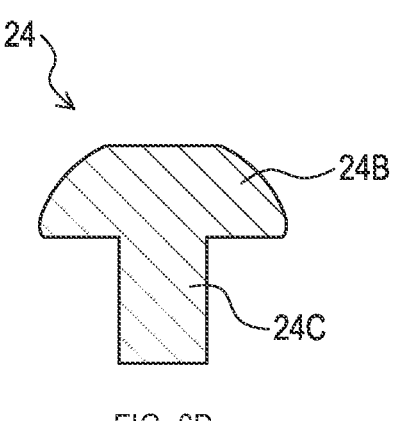
FIG. 6B is a schematic cross-sectional view of a rib in an embodiment different from FIG. 1.

Furthermore, as shown in FIGS. 6A and 6B, the rib 24 may comprise a support portion 24B and a leg portion 24C. The support portion 24B is a part in contact with the second plate surface 52 of the first filter 5A. The leg portion 24C is a part connecting the main body 2A of the outer case 2 and the support portion 24B to each other.

The width of the support portion 24B is larger than the width of the leg portion 24C. That is, the rib 24 may have a T-shape in a cross section perpendicular to the extending direction. Thus, a contact area between the first filter 5A and the rib 24 can be increased. In addition, by chamfering the support portion 24B as shown in FIG. 6B, a damage to the first filter 5A can be inhibited.

Figure 6C:
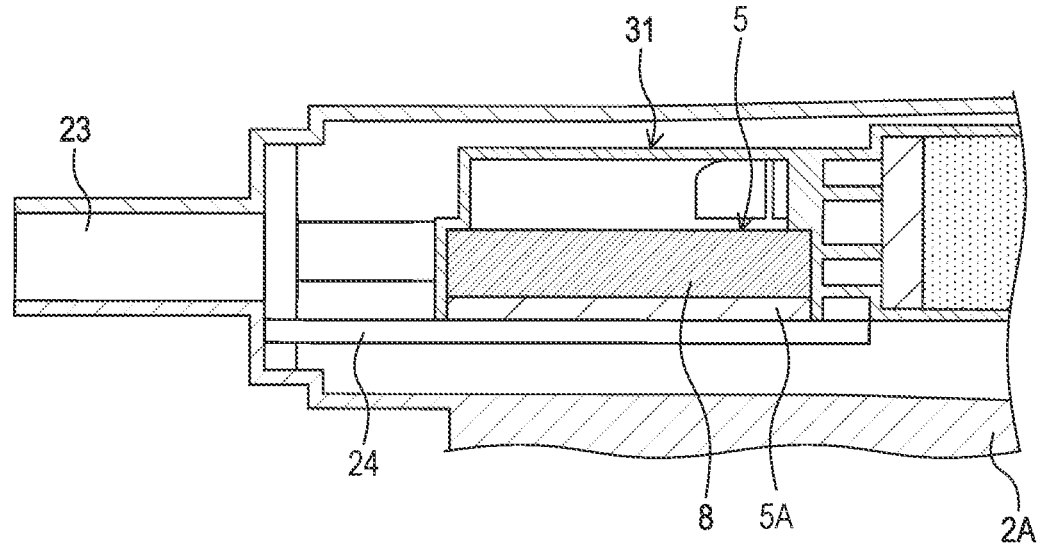
FIG. 6C is a schematic cross-sectional view of an area around a second adsorption chamber of a canister in an embodiment different from FIG. 3B.

As shown in FIG. 6C, the rib 24 may protrude from the inner surface of a wall provided with the atmosphere port 23 in the main body 2A of the outer case 2. Thus, the rib 24 is more flexible, making it easier to assemble the inner case 3 to the outer case 2.

[1-2. Effects]

According to the embodiment detailed above, the following effects can be obtained.

(1a) By inserting the inner case 3 into the outer case 2, it is possible to obtain the canister 1 comprising the first adsorption chamber 4 and the second adsorption chamber 5 having flow directions different from one another. The second plate surface 52 of the first filter 5A is in contact with the outer case 2, and the second plate surface 52 of the first filter 5A is provided with the open portion, thereby making it possible to stably hold the first filter 5A while ensuring a gas flow path.

(1b) The second plate surface 52 of the first filter 5A is in contact with the rib 24 extending parallel to the second plate surface 52, thereby making it possible to stably hold the first filter 5A while ensuring the area of the open portion of the first filter 5A.

(1c) The accommodation portion 31F of the inner case 3 is in contact with the rib 24, whereby a load that the first filter 5A receives from the rib 24 is distributed to the accommodation portion 31F. Thus, it is possible to reduce damage to the first filter 5A caused by the vibration of the vehicle.

2. Second Embodiment

[2-1. Configuration]

Figure 7:
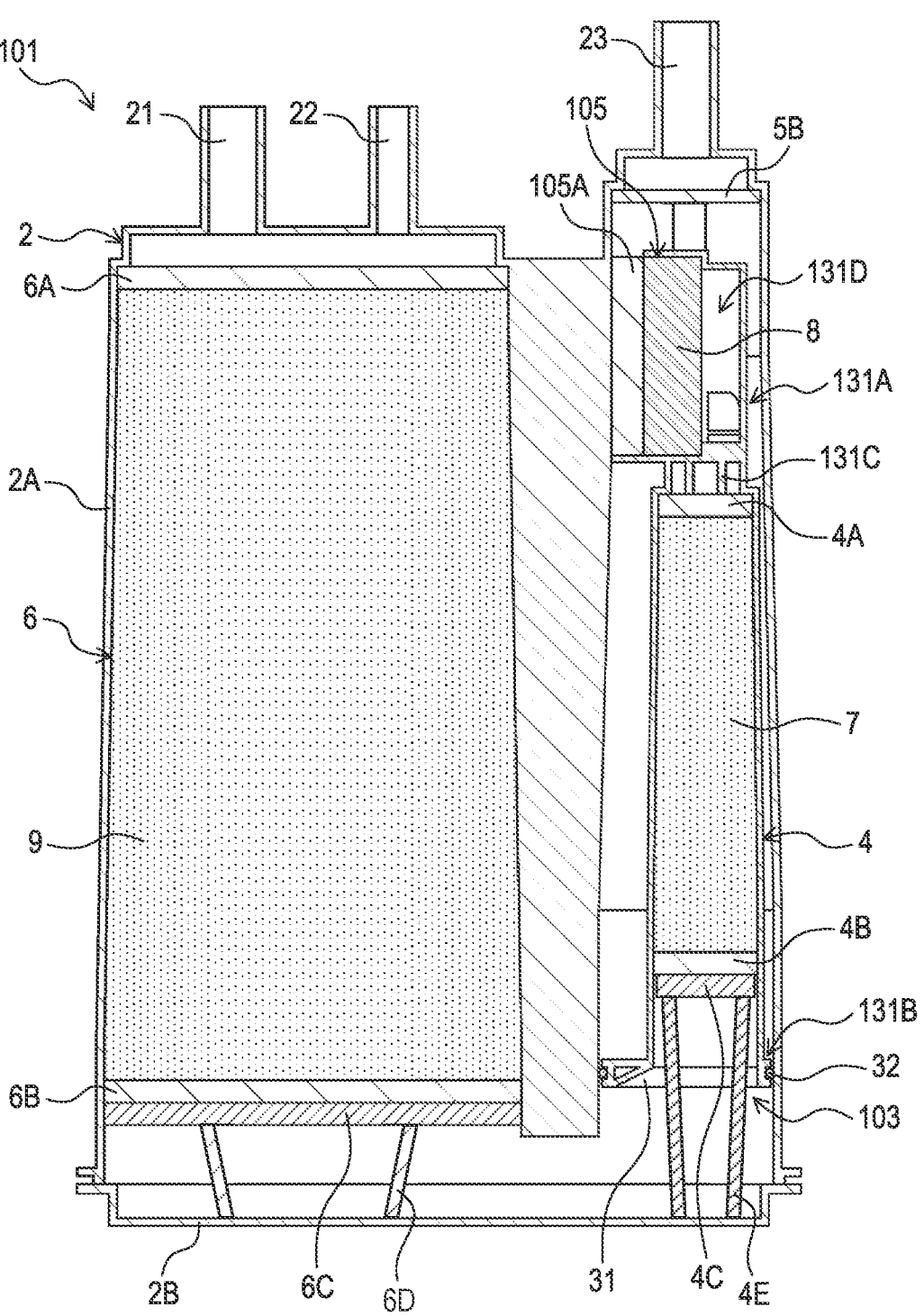
FIG. 7 is a schematic cross-sectional view of a canister in an embodiment different from FIG. 1.

A canister 101 shown in FIG. 7 adsorbs and desorbs evaporated fuel generated in a fuel tank. The canister 101 comprises an outer case 2, an inner case 103, a first adsorption chamber 4, a second adsorption chamber 105, a third adsorption chamber 6, a first adsorbent 7, a second adsorbent 8, and a third adsorbent 9.

Since the outer case 2, the first adsorption chamber 4, the third adsorption chamber 6 and the adsorbents 7, 8, and 9 of the canister 101 are the same as those of the canister 1 of FIG. 1, the same reference numerals are used and the description thereof is omitted.

<Inner Case>

The inner case 103 is arranged inside the outer case 2, and comprises an internal space connected to the atmosphere port 23. The inner case 103 is obtained, for example, by molding a resin using a mold.

Figure 8A:
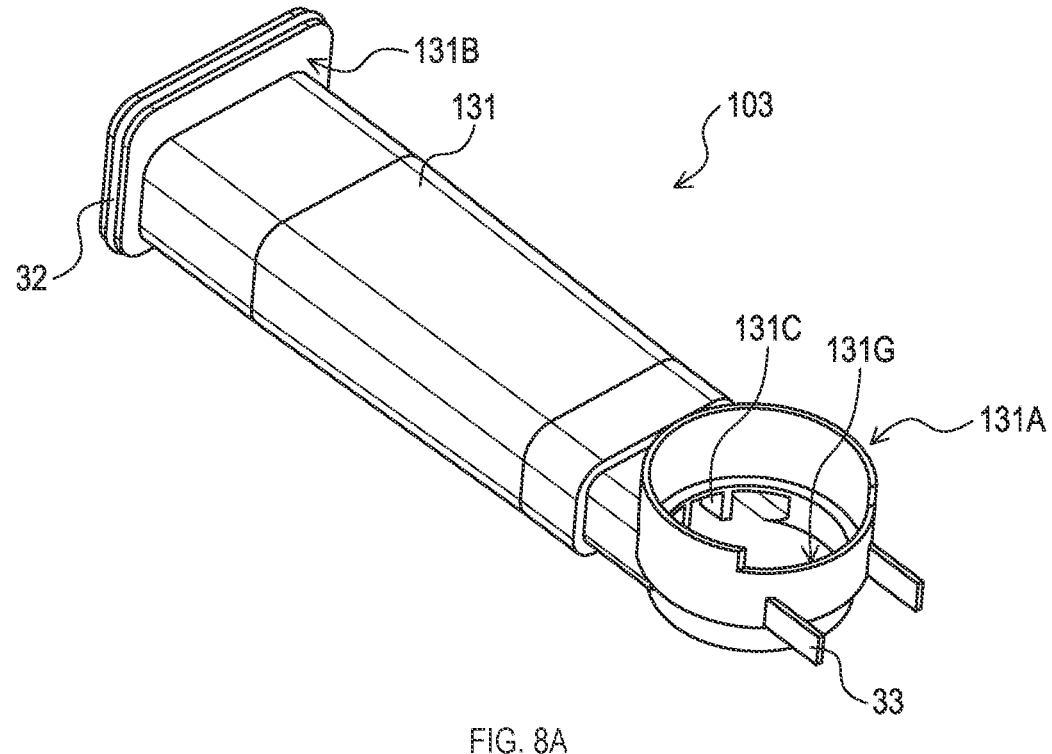
FIG. 8A is a schematic perspective view of an inner case in the canister of FIG. 7.
Figure 8B:
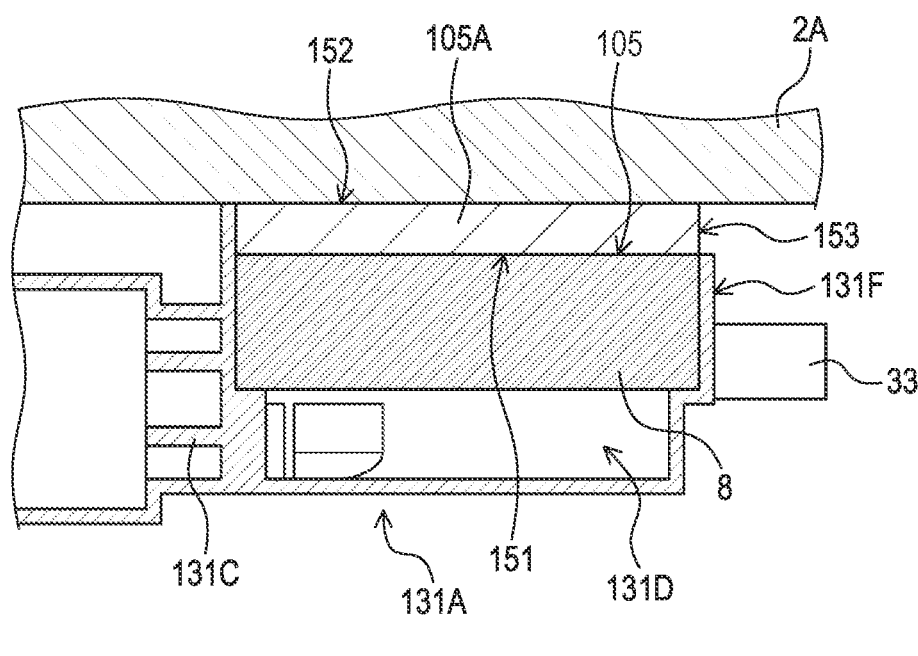
FIG. 8B is a schematic cross-sectional view of an area around a second adsorption chamber in the canister of FIG. 7.

As shown in FIGS. 8A and 8B, the inner case 103 comprises a cylindrical member 131 in a cylindrical shape, a sealing member 32, and a protrusion 33. The sealing member 32 and the protrusion 33 are the same as those of the inner case 3 of the canister 1 of FIG. 1.

The cylindrical member 131 comprises a first end 131A and a second end 131B. The second end 131B is the same as the second end 31B of the inner case 3 of FIG. 1. The first end 131A is an end to be connected to the atmosphere port 23. The first end 131A comprises a rotating portion 131D partitioned from the first adsorption chamber 4 by a partition member 131C, and an accommodation portion 131F. The partition member 131C and the rotating portion 131D are the same as the partition member 31C and the rotating portion 31D of the inner case 3 of FIG. 1.

The accommodation portion 131F is formed by cutting out a part of the accommodation portion 31F of the inner case 3 of FIG. 1. Specifically, the accommodation portion 131F comprises a notch 131G to expose a part of a side surface 153 of a first filter 105A from the inner case 103. The notch 131G is provided to the accommodation portion 131F in a region near the atmosphere port 23.

<Second Adsorption Chamber>

The second adsorption chamber 105 is arranged in the internal space of the inner case 103 (specifically, inside the first end 131A).

The second adsorption chamber 105 accommodates the second adsorbent 8, and is arranged between the first adsorption chamber 4 and the atmosphere port 23 in the flow path of the evaporated fuel. The function of the second adsorption chamber 105 is the same as that of the second adsorption chamber 5 of the canister 1 shown in FIG. 1.

The second adsorption chamber 105 is defined by the first filter 105A arranged to block the first end 131A of the inner case 103 and a step in the first end 131A. The second filter 5B, which is the same as that of the canister 1 of FIG. 1, is arranged between the first filter 105A and the atmosphere port 23 (see FIG. 7).

The first filter 105A is a plate-shaped member arranged between the second adsorbent 8 and the atmosphere port 23 in the flow path of the evaporated fuel, and partitions a space communicating with the atmosphere port 23 from the second adsorption chamber 105. The first filter 105A defining the second adsorption chamber 105 has a function similar to the function of the filters 4A, 4B of the first adsorption chamber 4.

The first filter 105A is press-fitted into the accommodation portion 131F of the inner case 103 so as to overlap the second adsorbent 8. That is, the accommodation portion 131F accommodates the second adsorbent 8 and the first filter 105A.

The first filter 105A comprises a first plate surface 151 in contact with the second adsorbent 8, a second plate surface 152 in contact with the inner surface of the main body 2A of the outer case 2, and the side surface 153 connecting the first plate surface 151 and the second plate surface 152 to each other.

The first plate surface 151 covers the entire surface of the second adsorbent 8 from which gas is discharged toward the atmosphere port 23. The entire second plate surface 152 is in contact with the inner surface of the main body 2A. The side surface 153 is partially exposed through the notch 131G of the accommodation portion 131F.

Thus, the side surface 153 comprises an open portion spaced from both the inner case 103 and the outer case 2. The gas passed through the second adsorbent 8 flows from the open portion of the side surface 153 of the first filter 105A toward the atmosphere port 23.

[2-2. Effects]

According to the embodiment detailed above, the following effects can be obtained.

(2a) The entire second plate surface 152 of the first filter 105A can be supported by the outer case 2, thereby making it possible to more stably hold the first filter 105A.

3. Other Embodiments

The embodiments of the present disclosure have been described; however, the present disclosure is not limited to the above-described embodiments, and the present disclosure can be practiced in various forms.

(3a) In the canisters of the above-described embodiments, the first filter arranged between the second adsorbent and the atmosphere port may be fixed to the accommodation portion of the inner case by, for example, ultrasonic welding.

(3b) In the canisters of the above-described embodiments, an auxiliary chamber accommodating an adsorbent may be provided between the inner case and the atmosphere port. That is, the atmosphere port may be connected to the inner case through another chamber (i.e. the auxiliary chamber).

(3c) A function of a single component in the aforementioned embodiments may be distributed to a plurality of components, or functions of a plurality of components may be integrated into a single component. Furthermore, a part of the configurations of the aforementioned embodiments may be omitted. At least a part of the configurations of the aforementioned embodiments may be added to or replaced with the configuration of another embodiment or other embodiments of the aforementioned embodiments. All the modes that are encompassed in the technical idea defined by the language in the claims are embodiments of the present disclosure.

What is claimed is:

1. A canister for adsorbing and desorbing evaporated fuel generated in a fuel tank of a vehicle, the canister comprising:
an outer case comprising a charge port configured to take in the evaporated fuel, a purge port configured to discharge the evaporated fuel, and an atmosphere port open to an atmosphere;
an inner case arranged inside the outer case and comprising an internal space connected to the atmosphere port directly or through another chamber;
a first adsorption chamber arranged in the internal space of the inner case;
a second adsorption chamber arranged between the first adsorption chamber and the atmosphere port in a flow path of the evaporated fuel in the internal space of the inner case;
a first adsorbent accommodated in the first adsorption chamber;
a second adsorbent accommodated in the second adsorption chamber; and
a filter having a plate shape and arranged between the second adsorbent and the atmosphere port in the flow path of the evaporated fuel,
wherein a gas flow direction in the second adsorption chamber intersects a gas flow direction in the first adsorption chamber,
wherein the filter comprises:
a first plate surface in contact with the second adsorbent;
a second plate surface at least a part of which is in contact with the outer case; and
a side surface connecting the first plate surface and the second plate surface to each other,
wherein at least one of the second plate surface or the side surface comprises an open portion spaced from both the inner case and the outer case,
wherein the outer case comprises a rib extending in a direction parallel to the second plate surface of the filter,
wherein the second plate surface comprises:
a contact portion in contact with the rib; and
the open portion,
wherein the rib extends in a direction parallel to an insertion direction of the inner case into the outer case, and
wherein the rib comprises a guide surface inclined to guide an insertion of the inner case into the outer case.

2. The canister according to claim 1,
wherein the inner case comprises an accommodation portion covering the side surface of the filter, and
wherein the accommodation portion is in contact with the rib.

3. The canister according to claim 1,
wherein the outer case comprises a holding portion that holds the inner case together with the rib.

4. The canister according to claim 1,
wherein the outer case comprises a main body into which the inner case is inserted,
wherein the rib comprises:
a support portion in contact with the second plate surface of the filter; and a leg portion connecting the main body and the support portion to each other; and
wherein a width of the support portion is larger than a width of the leg portion.

5. The canister according to claim 1,
wherein the side surface comprises the open portion.

6. The canister according to claim 3,
wherein the outer case comprises a holding portion that holds the inner case together with the rib.

7. The canister according to claim 2,
wherein the outer case comprises a main body into which the inner case is inserted,
wherein the rib comprises;
a support portion in contact with the second plate surface of the filter; and
a leg portion connecting the main body and the support portion to each other, and
wherein a width of the support portion is larger than a width of the leg portion.

8. A canister for adsorbing and desorbing evaporated fuel generated in a fuel tank of a vehicle, the canister comprising:
an outer case comprising a charge port configured to take in the evaporated fuel, a purge port configured to discharge the evaporated fuel, and an atmosphere port open to an atmosphere;
an inner case arranged inside the outer case and comprising an internal space connected to the atmosphere port directly or through another chamber;
a first adsorption chamber arranged in the internal space of the inner case;
a second adsorption chamber arranged between the first adsorption chamber and the atmosphere port in a flow path of the evaporated fuel in the internal space of the inner case;
a first adsorbent accommodated in the first adsorption chamber;
a second adsorbent accommodated in the second adsorption chamber; and
a filter having a plate shape and arranged between the second adsorbent and the atmosphere port in the flow path of the evaporated fuel,
wherein a gas flow direction in the second adsorption chamber intersects a gas flow direction in the first adsorption chamber,
wherein the filter comprises:
a first plate surface in contact with the second adsorbent;
a second plate surface at least a part of which is in contact with the outer case; and
a side surface connecting the first plate surface and the second plate surface to each other,
wherein at least one of the second plate surface or the side surface comprises an open portion spaced from both the inner case and the outer case,
wherein the outer case comprises a rib extending in a direction parallel to the second plate surface of the filter,
wherein the second plate surface comprises:
a contact portion in contact with the rib; and
the open portion, and
wherein the outer case comprises a holding portion that holds the inner case together with the rib.

9. The canister according to claim 8,
wherein the inner case comprises an accommodation portion covering the side surface of the filter, and
wherein the accommodation portion is in contact with the rib.

10. The canister according to claim 9, wherein the outer case comprises a main body into which the inner case is inserted, wherein the rib comprises:

a support portion in contact with the second plate surface of the filter; and a leg portion connecting the main body and the support portion to each other, and wherein a width of the support portion is larger than a width of the leg portion.

11. The canister according to claim 8, wherein the outer case comprises a main body into which the inner case is inserted, wherein the rib comprises:

a support portion in contact with the second plate surface of the filter; and a leg portion connecting the main body and the support portion to each other, and wherein a width of the support portion is larger than a width of the leg portion.

12. The canister according to claim 8, wherein the side surface comprises the open portion.

13. A canister for adsorbing and desorbing evaporated fuel generated in a fuel tank of a vehicle, the canister comprising:

an outer case comprising a charge port configured to take in the evaporated fuel, a purge port configured to discharge the evaporated fuel, and an atmosphere port open to an atmosphere;

an inner case arranged inside the outer case and comprising an internal space connected to the atmosphere port directly or through another chamber;

a first adsorption chamber arranged in the internal space of the inner case;

a second adsorption chamber arranged between the first adsorption chamber and the atmosphere port in a flow path of the evaporated fuel in the internal space of the inner case;

a first adsorbent accommodated in the first adsorption chamber;

a second adsorbent accommodated in the second adsorption chamber; and a filter having a plate shape and arranged between the second adsorbent and the atmosphere port in the flow path of the evaporated fuel, wherein a gas flow direction in the second adsorption chamber intersects a gas flow direction in the first adsorption chamber, wherein the filter comprises:

a first plate surface in contact with the second adsorbent;

a second plate surface at least a part of which is in contact with the outer case; and a side surface connecting the first plate surface and the second plate surface to each other, wherein at least one of the second plate surface or the side surface comprises an open portion spaced from both the inner case and the outer case, wherein the outer case comprises a rib extending in a direction parallel to the second plate surface of the filter, wherein the second plate surface comprises:

a contact portion in contact with the rib; and the open portion, wherein the outer case comprises a main body into which the inner case is inserted, wherein the rib comprises:

a support portion in contact with the second plate surface of the filter; and a leg portion connecting the main body and the support portion to each other, and wherein a width of the support portion is larger than a width of the leg portion.

14. The canister according to claim 13, wherein the inner case comprises an accommodation portion covering the side surface of the filter, and wherein the accommodation portion is in contact with the rib.

15. The canister according to claim 13, wherein the side surface comprises the open portion.

* * * * *